(12) United States Patent  
Spitzig

(10) Patent No.: US 8,144,936 B2  
(45) Date of Patent: Mar. 27, 2012

(54) CAMERA BASED INK APPLICATION VERIFICATION

(75) Inventor: Roger Spitzig, Ontario (CA)

(73) Assignee: Bell and Howell, LLC, Durham, NC (US)

( * ) Notice: Subject to any disclaimer, the term of this patent is extended or adjusted under 35 U.S.C. 154(b) by 748 days.

(21) Appl. No.: 12/326,984

(22) Filed: Dec. 3, 2008

(65) Prior Publication Data

US 2009/0148002 A1    Jun. 11, 2009

Related U.S. Application Data

(60) Provisional application No. 60/992,571, filed on Dec. 5, 2007.

(51) Int. Cl.
*G06K 9/00* (2006.01)
*G06K 15/00* (2006.01)

(52) U.S. Cl. .................... 382/112; 382/274; 358/1.14

(58) Field of Classification Search .......... 382/100, 382/102, 103, 106–107, 112–116, 155, 168, 382/173, 181–191, 209, 219, 232, 254, 276, 382/290–291, 305, 312, 101, 274; 700/213; 358/1.14; 235/375; 209/584; 1/1
See application file for complete search history.

(56) References Cited

U.S. PATENT DOCUMENTS

| | | | |
|---|---|---|---|
| 6,370,521 B1 * | 4/2002 | Pigos et al. | 1/1 |
| 6,575,358 B2 * | 6/2003 | O'Callaghan et al. | 235/375 |
| 7,804,979 B2 * | 9/2010 | Spitzig et al. | 382/101 |
| 7,986,421 B2 * | 7/2011 | Chen et al. | 358/1.14 |
| 2005/0149225 A1 * | 7/2005 | Spitzig et al. | 700/213 |
| 2006/0108266 A1 * | 5/2006 | Bowers et al. | 209/584 |

* cited by examiner

*Primary Examiner* — Seyed Azarian
(74) *Attorney, Agent, or Firm* — McDermott Will & Emery LLP

(57) ABSTRACT

The present application relates to a method, apparatus and programmable product for verifying print quality of a document assembled on a document manufacturing device. In particular, a system and related method for performing print quality assessment of the document in real-time during manufacture of the document are provided. The present teachings allow for identification of the inherent qualities or pre-existing print markings of the document as a separate process from that of a process for identification and verification of markings applied onto the document by the print operation. In this way, a determination of print quality may be determined irrespective of the influence of the inherent qualities or pre-existing print markings.

20 Claims, 3 Drawing Sheets

CAMERA BASED INK APPLICATION VERIFICATION

RELATED APPLICATIONS

This application claims the benefit of U.S. Provisional Application No. 60/992,571, filed Dec. 5, 2007, entitled "CAMERA BASED INK APPLICATION VERIFICATION", the disclosure of which is entirely incorporated herein by reference.

TECHNICAL FIELD

The present subject matter relates to a method, apparatus and programmable product for verifying print quality of a document.

BACKGROUND

Ink jet is a computer-to-print technology in which digital signals drive droplets of ink through a print head and then directly onto a substrate. The print head may consist of one or more nozzles through which ink droplets are ejected and directed onto the substrate. Ink jet printing differs from other plate-less digital technologies, like copier or toner-based technologies (e.g., as employed in desktop printer applications), because it is non-contact—the printing device never comes into direct contact with the substrate. While employed in consumer applications, ink jet printers are also well suited for various industrial and commercial uses, wherein variable, high speed printing or on-demand print handling capability is necessary.

One primary cause of ink jet printing problems is due to ink drying on the print head's nozzles, causing the pigments and dyes to dry out and form a solid block of hardened mass that plugs the microscopic ink passageways. When this occurs, the expected ink output markings to be applied to the substrate are compromised, often appearing, if at all, as faded, smeared, incomplete, jagged, disoriented, etc. Such occurrences, wherein the appearance of the printed output as placed onto the intended substrate is poor, is considered poor print quality. Obviously, this is not the preferred outcome, particularly in instances where high volumes of documents, packages, or other print items of various substrates are required to be produced with specific print markings. If the exemplary print quality defects described above are discovered too late, additional time, materials and effort must be further employed in reprinting the defective items.

Various methods are employed today for identifying print quality issues. For example, clogged nozzles can be detected by periodically printing a test print item (e.g., a page of a document) and verifying the print item for quality. Another method is to intentionally print a known pattern onto a select portion of a print item in process and subsequently verifying the pattern for quality. Instances where the pattern or markings do not exhibit quality—i.e., the actual printed markings differ from the intended print markings—highlights an occurrence of print quality failure. Identification and verification of such failures may be performed through the usage of an imaging system, which may include a camera device and select pattern recognition software (e.g., OCR or image recognition software).

While these methods and accompanying tools may be effective, they do not address instances of erroneous print quality verification, and particularly, those instances wherein a print quality failure is erroneously determined due to inaccurate verification. This is common in instances where the substrate upon which the print item is to be composed includes various inherent characteristics that may affect the verification process. For instance, consider a document printing job that requires the generation of hardcopy documents onto a particular pre-printed stock paper. If the verification process does not account for the presence of pre-existing print markings resident upon the paper stock in advance, print quality failure will be the natural result. This would be the only logical conclusion of the imaging system, as additional patterns (the pre-existing markings) besides the actual printed markings would appear on the document subsequent to print. Even if pre-existing markings were accounted for in advance by the verification system, accurate print quality failure could be hampered by the presence of paper creases, folds, wrinkles, grease marks, paper fibers, unintended ink blots and other such inherent qualities of the stock paper.

For the reasons stated above, a method and system for improved print verification is needed. Such improved technology, for example, should account for both pre-existing print markings and inherent qualities of a particular substrate, to enable accurate print verification.

SUMMARY

The teachings herein alleviate one or more of the above noted problems by providing a method, system and programmable product for enhancing print quality verification, for example, irrespective of the inherent qualities of or pre-existing print marking upon the intended print item. The present teachings allow for identification of the inherent qualities of the print item as a separate process than the process for identification and verification of markings placed onto the document by the print operation. In this way, a determination of print quality, and more specifically, the quality of the one or more print heads of a given printer, may be determined irrespective of the influence of the inherent qualities or pre-existing print markings.

It is desirable to provide a method and related system for performing print quality assessment of a document in real-time during manufacture of the document by a document manufacturing device. The method includes receiving data representative of a base stock upon which print data is to be applied and applying the print data as printing onto the base stock based on print file instructions. Data representative of the base stock is acquired along with the printing. The received image data representative of the base stock is compared with the acquired image data representative of the base stock to extract a representation of the printing; and the representation of the printing is compared with expected print data contained in the print file instructions. A determination is made as to whether or not there is any difference between the representation of the printing and the expected print data. A print quality assessment is rendered based on results of the determining step to affect subsequent processing of the document.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only.

DETAILED DESCRIPTION

As used herein, "print quality" is a conditional term suggestive of the nature, means or extent to which print data is placed onto a print item by a printer in accord with specified print instructions—i.e., as contained within a print file. In general, when print data intended for placement onto a print item is physically placed onto the print item as instructed, this is generally referred to as an instance of print quality. Conversely, when print data intended for placement onto a print item is not physically placed onto the print item as intended, this is generally referred to as an instance of print quality failure. Failed print quality may be the result of various physical defects relative to the print data as placed onto the print item, including but not limited to fading, smearing, incompletion, jaggedness, or general disorientation of the print data as placed. Furthermore, the teachings herein are applicable to verification of print quality as applied by any print application mechanism, whether ink jet, laser, offset printing or other known implementations.

Also, as used herein, the term "print item" refers to any item composed of a substrate suitable for being printed upon, including but not limited to packages of various material composition, plastic wrappers, adhesive labels, and envelopes and paper of a specific fiber content or stock. Various other goods and manufactures of varying material composition may also be print items. In general, print items may be processed in various ways, including via the usage of an inserter device or as part of a print press production process. The exemplary teachings herein are not limited to any one particular print processing environment, document manufacturing device or print production device. Furthermore, the teachings herein are suitable for affecting operation of any subsequent processing devices 400 upon said print items accordingly.

Figure 1:
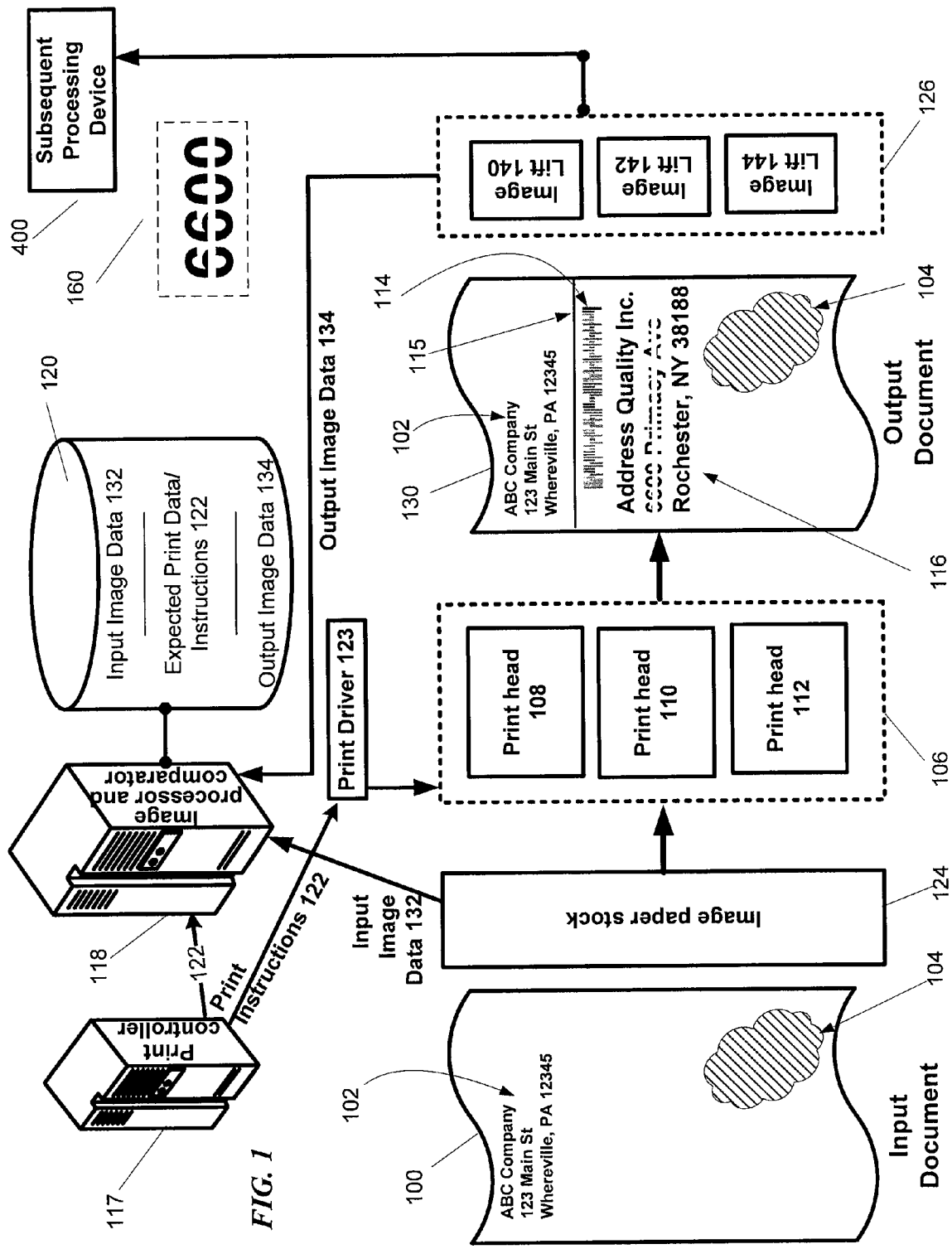
FIG. 1 is an exemplary depiction of a system for verifying the quality of a print process.
Figure 2:
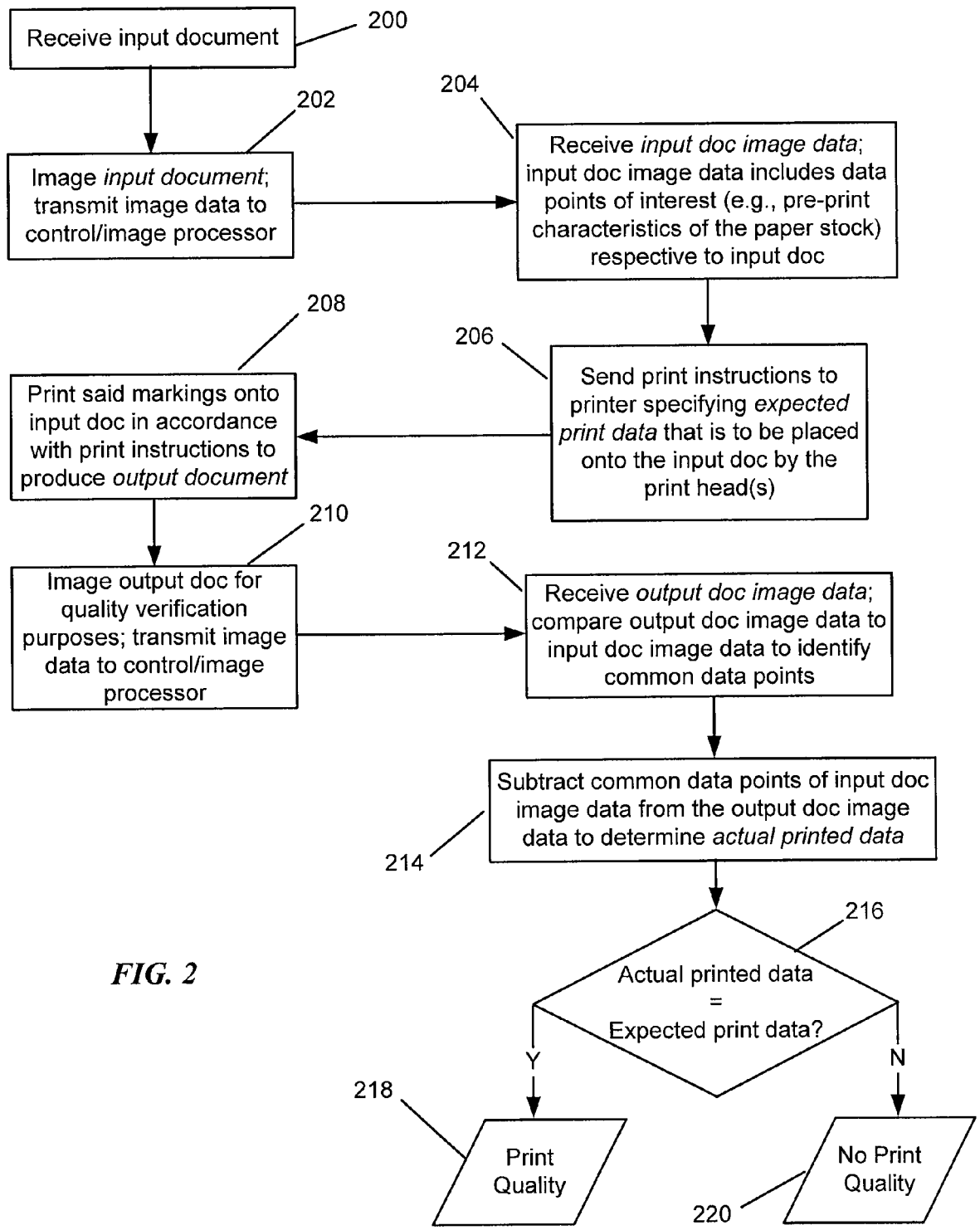
FIG. 2 is a flowchart depicting the exemplary process by which the print quality of a print process may be determined.

Turning now to FIG. 1, an exemplary system for enabling print quality verification to be performed on an input print item or base stock 100 is depicted. The input print item 100 in this case is a document composed of a paper stock having various pre-existing print markings 102. In the example the pre-existing markings 102 were printed onto the document during a prior print processing stage—i.e., a form letter. The pre-existing print markings 102 are detected by the imaging system 124 and used for later comparison with print instructions 122 and output image data 134 as part of the print quality check. Alternately the pre-existing print markings 102 maybe provided as a data file from a system interface instead of from the image paper stock sensor 124. In this case sensor 124 maybe eliminated along with detection of print substrate defects 104. As another alternative, the pre-existing print markings 102 maybe determined by observing the pre-printed data 102 during startup by using the imaging lift system 126 which would start imaging pages without knowing what is on paper stock 100. By comparing the first N images from the image lift system 126, the image processor 118 can perform a comparison algorithm and identify anything which is common from page to page. This common information would represent the pre-existing markings such as a return address or other common information. After a sufficient number of samples, the image processor 118 would create data representative of the base stock pre-existing markings 102 or 104. Numerous techniques can be employed by those skilled in the art to identify pre-existing markings on the base stock 100 that do not represent material printed by print system 106. The data representative of a base stock is received by the image processor and comparator 118 to enable print quality analysis. The exemplary examples of data representative of a base stock which are provided, include but are not limited to input image data 132, print file data and data derived from images analyzed during start up. Of course, the base stock maybe blank and void of defects, which would require the comparator 118 to perform the print quality analysis using output image data 134 and expected print instructions 122. Also, while not necessarily intentional, the document 100 also has an inherent quality or feature 104 in the form of a 'watermark', logo, picture or a blot or smudge. If feature 104 is a smudge or blot, this would represent a quality defect which may require operator intervention or reject of the document when it is processed by a subsequent processing device 400. Inherent qualities of a particular print item or the substrate (e.g., paper stock) of which it is composed may include, but is not limited to: creases, folds, wrinkles, grease marks, paper fibers, unintended ink blots, stains, ridges, surface bubbles, tears, stretch marks, indentations, punctures, holes and other such physical characteristics of the print item which may be detected using an imaging system 124.

The document 100 requires various print data to be printed thereon by a printing device 106 complete with one or more print heads 108-112 driven by a print driver 123. The printing device 106 may be controlled by or part of a print controller 117 that provides the necessary print instructions 122 that initialize and activate the print driver 123. For the sake of clarity with respect to the teachings herein, it should be noted that the print controller 117 may be communicably connected with an image processor and comparator 118. Alternatively, the print controller 117 may operate independent of the image processor and comparator for enabling execution of the printing device 106 expressly. Those skilled in the art will recognize that either implementation may be employed with respect to the teachings herein.

The one or more print heads 108-112 operate in connection with the print device 106 to coordinate the release of ink in a manner consistent with the desired print data to be marked onto the document 100. The print heads 108-112 may access one or more ink reservoirs, and may consist of one or more nozzles through which ink droplets are ejected and directed in a precise manner onto the document 100. In close proximity to said nozzles are one or more image capture devices 140-144, which may be suitably aligned for detecting the application of ink through the nozzle as applied droplet-by-droplet onto the document 100 (more regarding this later). In this example, the print data to be applied by the print heads 108-112 are a barcode 114, a solid horizontal line 115 and a three line address block 116. Other forms of printed information may include text, logo, pictures or other items that are compatible with the capabilities of the printer system 106. All of which maybe printed by printers 108, 110, 112 or printer system 106. Placement, orientation, text, image characteristics and other properties that affect the physical appearance of the print data 114, 115 and 116 is dictated by a print file—the one or more print instructions 122 capable of being interpreted by the printing device 106 for carrying out print requests.

The image processor and comparator 118—which serves as a type of control processor in the context of a print item processing operation—also interfaces with various other devices to orchestrate the print item processing effort and print quality verification effort. This includes imaging devices 124 and 126, which capture images of the input document 100 and the output document 130 respectively. The image processor and comparator 118 may also communicate with the print controller 117 in order to receive print instructions 122. Hence, the print data and/or associated print instructions 122 to be carried out with respect to document 100 are accessible to the image processor and comparator 118 via a database 120.

In accord with the teachings, once received the input document 100 is imaged by the first imaging device 124 in order to acquire image data representative of the input document 100 (Event 200 and 202). The imaging device 124 may be any system suitable for performing imaging of documents of various sizes and formats and with high resolution for detection of inherent qualities, which may often be subtle. In the case of the input document 100, input document image data 132 compiled would include image data representative of the pre-existing print marks 102 and the inherent qualities (smudge 104) resident upon the document. Hence, while the input document image data 132 would represent a composite image of the entire document, the pre-existing print marks 102 and smudge 104 represent specific data points of interest. More about these data points of interest will be discussed subsequently.

Upon image capture, the input document image data 132 is transmitted to the image processor and comparator 118 (Event 202), whereupon receipt, it is stored to database 120 (Event 204). Subsequently, the print driver 123 drives execution of the print heads 108-112 of printer 106 as required for generating the intended or expected print data 122 onto the input document 100 (Event 206). By expected print data 122, it is meant that this data is what is expected to be output onto the input document 100 by the printer 106 in the absence of any print quality issues. Once the instructions are received and the input document 100 is fed to the printer 106, the one or more print heads 108-112 operate accordingly. This yields the output document 130 (Event 208), which unlike the input document 100 includes the additional print data 114-116.

In the example depicted in FIG. 1, the printed address block 116 as rendered to the document is not without error. In this case, a horizontal gap appears across the primary street address (second line) of the address block resulting from a blockage within a given nozzle of a print head 108-112. This error is illustrated in inset drawing 160, which depicts a blown up subsection of the primary address number with the undesired horizontal gap passing through. Obviously, this error affects the overall legibility of the address block 116 and with the proper verification, should result in a print quality error being determined. This error could be representative of a failed ink jet or a printer control error.

To enable such verification, the exemplary teachings further call for the use of the second imaging device 126, which may also employ high resolution imaging techniques to acquire image data respective to the output document 130. The imaging device 126 may essentially scan the entire document, similar to device 124, for acquisition and generation of output document image data 134. Alternatively, the second imaging device 126 may be comprised of a plurality of image capture devices 140-142 (e.g., cameras) positioned within close proximity to the print heads 108-112. This arrangement results in a one-to-one correlation between the nozzle of a given print head 108-112 and a given image capture device 140-144, whereby the separate images in combination formulate a representation of the whole output document image data 134. It should be noted with respect to the latter arrangement, that while FIG. 1 depicts the second imaging device 126 as not being within close proximity to the nozzles of the print heads, this need not be the case. Indeed, the cameras, linear arrays, area scanners or other imaging devices employed as the second imaging device 126 may be only proximally offset from the print heads 108-112 if not directly inline. In alternative arrangements, the image capture devices, in one-to-one direct correlation with a respective print head, may even be movable along a sliding track upon which its respective print head is capable of traversing.

Once the output document image data 134 is acquired, it is transmitted to the image processor and comparator 118 (Event 210). The image processor and comparator 118 upon receipt of the data then stores it, and performs an analysis of the output document image data 134 as stored with the input document image data 132 as stored (Event 212). This analysis process begins with a comparison between the sets of image data to identify any shared or common data points. In keeping with the example herein, the shared or common data points between the input document image data 132 and the output document image data 134 as acquired include those data points representative of the pre-existing address block 102 and the smudge 104.

Once the common data points are identified, the analysis continues with a subtraction of the common data points as shared between the two image data sets from the output document image data 134 (event 214). Again, with respect to exemplary FIG. 1, the subtraction of the common data points—i.e., that related to the pre-existing address block 102 and the smudge 104—from the overall data points that comprise the output document image data set 134 yields image data representative of the actual printed data. The actual printed data in this case would be data points representative of address block 116, horizontal line 115 and barcode 114.

Having determined the actual printed data, the analysis may continue with a comparison of the actual printed data and the expected print data 122 (Event 216). This comparison or match process may involve translation of the image data into composite print file data points, or vice versa, for enabling the comparison. Nevertheless, verification of a match between the expected output and the actual output should sufficiently reveal whether a quality print resulted. If the actual printed data is equivalent to the expected print data 122, this indicates that there was sufficient print quality (Event 218). When the actual printed data is not equivalent to the expected print data 122, this indicates that there was failed print quality (Event 220). With this in mind, a verification of failed print quality would be the outcome with respect to the exemplary output document 130, upon identifying the defect as shown in 160. Pursuant to this verification, additional procedures may be employed to correct the defective print head—i.e., print head 110 corresponding to the particular defect identified at 160—including replacement, cleaning or the like.

Skilled practitioners will recognize that various techniques exist today for performing the various image analytics described above, including but not limited to image comparison, pixel subtraction, image matching, and image compensation as described above. Interpretation of the various image data may be performed in whole or part via the usage of various object character recognition (OCR) or other image data processing techniques. Typical OCR utilities include an optical scanner for reading numeric or alpha-numeric characters, and sophisticated software for analyzing images and graphic primitives. Alternatively, the OCR system may include a combination of hardware (e.g., specialized circuit boards) and software to recognize characters, or can be executed entirely through software operating within the image processor and comparator 118 or within the imaging devices 124 and 126 themselves. As yet another alternative, in instances where the imaging capability of the image processor and comparator is not direct, the image processing functions may be performed externally (e.g., by an independent processor), and subsequently communicated to the image processor and comparator 118 over a network. Those skilled in the art will recognize that various OCR utilities and configurations may be employed for the purpose of analyzing image data. Indeed, any technique is within the scope of the teachings herein.

It should be noted that the imaging devices 124 and 126, and print device 106 may all function as individual components of an in-line system, such as an inserter device or high speed print item production device. Such devices may feature a transport mechanism upon which print items may be directed along a transport path, whereupon the imaging systems and/or printer may operate upon a given print item. Generally, the imaging devices 124 and 126 and print device 106 would be positioned along the transport, within close range of the print item, for accommodating the movement of the print item at high speeds. Of course, those skilled in the art will recognize that any particular arrangement is within the scope of the art, and that even offline processes may benefit from the approach presented herein.

Although the discussion above has focused largely on the methodologies, those skilled in the art will recognize that those methodologies may be controlled or implemented by one or more processors/controllers, such as one or more computers or servers (ref. numeral 118 in FIG. 1). Typically, each such processor/controller is implemented by one or more programmable data processing devices. The hardware elements operating systems and programming languages of such devices are conventional in nature, and it is presumed that those skilled in the art are adequately familiar therewith.

Figure 3:
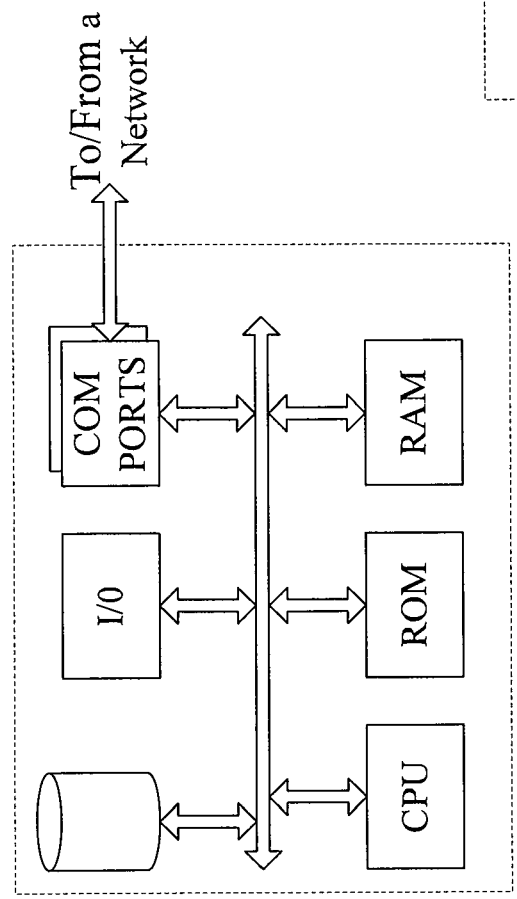
FIG. 3 illustrates a network or host computer platform, as may typically be used to implement a server.
Figure 4:
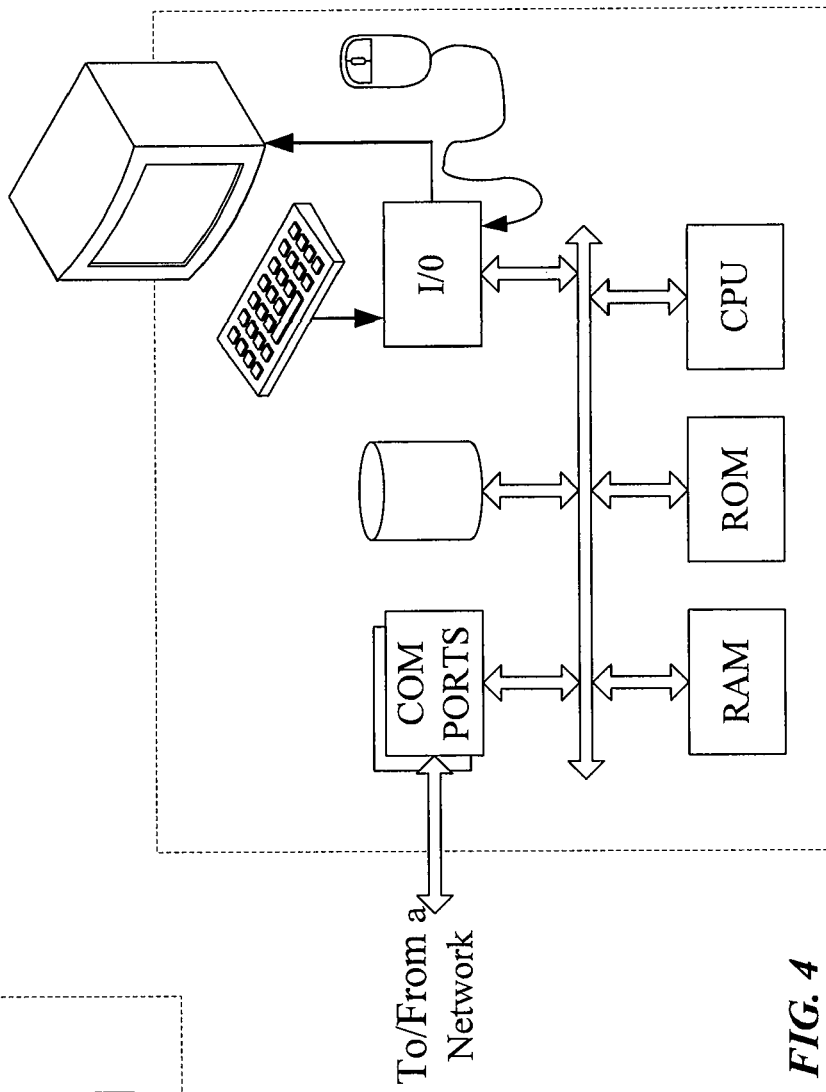
FIG. 4 depicts a computer with user interface elements.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and, as a result, the drawings should be self-explanatory.

For example, image processor and comparator 118 may be a PC based implementation of a central control processing system like that of FIG. 4, or may be implemented on a platform configured as a central or host computer or server like that of FIG. 3. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as print scheme instructions and image data generated in response to the verification operations. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems such as the printing device 106 and imaging devices 124, 126. In a document production environment, such as in the case of an inserter computer communications may extend to other reader equipment and to various inserter elements. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for performing print quality assessment of an output document in real-time during manufacture of the output document by a document manufacturing device, the method comprising steps of:
   receiving data representative of an input document upon which pre-print data is applied;
   applying, by way of a printing device, printing onto the input document based on print file instructions to produce the output document;
   acquiring image data representative of the output document containing both the pre-print data and the printing applied thereon;
   comparing:
     the received data representative of the input document and the print file instructions used to produce the output document with the acquired image data representative of the output document to extract a representation of the printing by way of print item processing;
       determining whether or not there is any difference between the representation of the printing, the data representative of the input document and the print file instructions; and
   rendering a print quality assessment based on results of the determining step to affect subsequent processing of the output document, wherein the rendering step includes providing a sufficient print quality notification following a determination that the representation of the printing matches the print file instructions and the data representative of the input document.

2. The method according to claim 1, wherein the receiving step includes:
   receiving information relating to one or more characteristics of the input document, the one or more characteristics being selected from one or more of: a crease, a fold, a wrinkle, a grease mark, paper fibers, an unintended ink blot, a stain, a ridge, a surface bubble, a tear, a stretch mark, an indentation, a puncture, a hole, printed data, a logo and a picture.

3. The method according to claim 2, wherein the information includes:
   image data or electronic representation of the input document.

4. The method according to claim 1, wherein the applying step includes printing one or more of the following: a barcode, an address block, text, logo, picture and a line.

5. The method according to claim 1, wherein the acquiring step includes:
   capturing an image of the output document with the printing applied thereto initially by one or more print heads.

6. The method according to claim 1, wherein the acquiring step is performed by an imaging device which is coupled to the one or more print heads.

7. The method according to claim 1, wherein the comparing step is performed by way of a processor adapted store the data representative of the input document upon which pre-print data is applied, the print instructions required to produce the output document, and the acquired image data representative of the output document.

8. The method according to claim 1, wherein the comparing step includes:
   comparing shared or common data points between the received data of the input document with the acquired image data representative of the output document.

9. The method according to claim 1, wherein the determining step includes:
performance of one or more of image comparison, pixel subtraction, image matching, image compensation and optical character recognition.

10. The method according to claim 1, wherein the input document is selected from a package, plastic wrapper, adhesive label, envelope or paper.

11. A computer comprising a processor, memory and a program stored in the memory, wherein execution of the program by the processor configures the computer to perform the steps of the method of claim 1.

12. An article of manufacture, comprising:
a machine readable storage medium; and
an executable program embodied in the storage medium for causing a computer to implement the steps of the method of claim 1.

13. A method for performing print quality assessment of an output document in real-time during manufacture of the output document by a document manufacturing device, the method comprising steps of:
receiving data representative of an input document upon which pre-print data is applied;
applying, by way of a printing device, printing onto the input document based on print file instructions to produce the output document;
acquiring image data representative of the output document containing both the pre-print data and the printing applied thereon;
comparing:
the received data representative of the input document and the print file instructions used to produce the output document with the acquired image data representative of the output document to extract a representation of the printing by way of print item processing;
determining whether or not there is any difference between the representation of the printing, the data representative of the input document and the print file instructions; and
rendering a print quality assessment based on results of the determining step to affect subsequent processing of the output document, wherein the rendering step includes providing a failed print quality notification following a determination that the representation of the printing does not match the data representative of the input document and the print file instructions.

14. An ink application verification system comprising:
a comparator configured to receive and store data representative of an input document upon which pre-print data is applied, and print instructions required to produce an output document;
a printer device configured to apply printing onto the input document in accordance with the stored print instructions to produce the output document; and
an image device in communication with the comparator, the comparator configured to acquire image data of the output document containing both the pre-print data and the printing applied to the input document by the printer device, wherein:
the comparator is configured to perform a comparison of:
the received and stored data representative of the input document and the print instructions required to produce the output document with the acquired image data representative of the output document with the printing applied by the printing device to extract a representation of the printing by way of print item processing, and
the comparator is configured to render a print quality assessment based on the comparison, the assessment affecting subsequent processing of the output document with the printing applied thereon, wherein the assessment includes a sufficient print quality notification following a determination that the representation of the printing matches the data representative of the input document and the print instructions.

15. The system according to claim 14, wherein the subsequent processing of the output document with the printing thereon is performed by a document manufacturing device, an inserting device or a print production device.

16. The system according to claim 14, wherein the comparator further comprises a database for storing the acquired image data of the output document.

17. The system according to claim 14, wherein the comparator is configured to receive image data representative of the output document by either in-line real-time image capture of the base stock, or from a digital representation of the output document.

18. The system according to claim 14, wherein the printer device comprises one or more ink print heads to apply ink to the input document in accordance with the print instructions.

19. The system according to claim 14, further comprising a second image scanning device for capturing image data representative of the input document prior to application of the printing by the printer.

20. An ink application verification system comprising:
a comparator configured to receive and store data representative of an input document upon which pre-print data is applied, and print instructions required to produce an output document;
a printer device configured to apply printing onto the input document in accordance with the stored print instructions to produce the output document; and
an image device in communication with the comparator, the comparator configured to acquire image data of the output document containing the pre-print data and the printing applied to the input document by the printer device, wherein:
the comparator is configured to perform a comparison of:
the received and stored data representative of the input document and the print instructions required to produce the output document with the acquired image data representative of the output document with the printing applied by the printing device to extract a representation of the printing by way of print item processing, and
the comparator is configured to render a print quality assessment based on the comparison, the assessment affecting subsequent processing of the output document with the printing applied thereon, wherein the assessment includes a failed print quality notification following a determination that the representation of the printing does not match the data representative of the input document and the print instructions.

* * * * *